United States Patent Office 2,816,137
Patented Dec. 10, 1957

2,816,137

METHOD OF PREPARING HYDROXY AROMATIC CARBOXYLIC ACIDS

Milton L. Clemens, Jr., Kingsport, Tenn., assignor to Eastman Kodak Company, Rochester, N. Y., a corporation of New Jersey No Drawing. Application August 9, 1954, Serial No. 448,769

14 Claims. (Cl. 260—518)

The invention relates to the preparation of hydroxy aromatic carboxylic acids and is particularly concerned with an improved method for preparing such acids without the formation of objectionable amounts of tarry by-products.

For many years, the Kolbe synthesis has been considered the classical and most convenient method for preparing hydroxy aromatic carboxylic acids. In essence, this method involves subjecting the anhydrous alkali metal phenolate to the action of carbon dioxide under relatively high pressures and at elevated temperatures. With this method, however, the yields of hydroxy aromatic carboxylic acids varies greatly from one phenolic compound to another, and there is usually an objectionable formation of tarry by-products.

In spite of this fact, the Kolbe synthesis has been widely used for a great many years, with a number of suggested modifications to minimize the formation of the tars or methods for separating the desired products from the tarry materials. Thus, for example, phenol has been converted to salicylic acid, hydroquinone has been converted to gentisic acid or to 2,5-dihydroxy terephthalic acid, β-naphthol has been converted to a hydroxy naphthoic acid, bis-phenols have been converted to bis-salicylic acid type compounds and m-amino phenols have been converted to carboxy-m-amino phenols. The method is also applicable for carboxylating a great variety of other phenolic compounds including the monocyclic and the polycyclic phenols.

In many of the industrial applications of the synthesis, the carboxylation had to be effected using an anhydrous alkali metal phenolate in the absence of any liquid diluent. In an attempt to avoid the necessity for anhydrous conditions, various specific solvents were proposed for use in the Kolbe synthesis. Thus, for example, halogenated benzenes have been used as a reaction vehicle, a well as heterocyclic ethers such as the dioxanes. In all of these modifications, however, objectionable amounts of tarry materials were formed, and it was necessary to purify the reaction product to remove such tars. This was particularly true in the preparation of gentisic acid which finds utility as a pharmaceutical. In one proposed synthesis, diisopropyl ether was employed to extract the gentisic acid from the tarry reaction mixture. It is desirable, however, to provide a method of preparing hydroxy aromatic carboxylic acids, including both mono- and dicarboxylated phenols, without the concomitant formation of objectionable amounts of tar and in good yield.

It is accordingly an object of this invention to provide an improved method for preparing hydroxy aromatic carboxylic acids.

It is another object of this invention to provide a new method of making such compounds while reducing the formation of tarry by-products to a minimal level.

Another object of the invention is to provide a method of making hydroxy aromatic carboxylic acids with or without the use of a solvent, and by a reaction with is not subject to the disadvantages inherent in most of the carboxylation processes employed heretofore.

Another object of the invention is to form gentisic acid and 2,5-dihydroxy terephthalic acid by an improved method.

Another object of the invention is to facilitate the preparation of carboxy derivatives of phenolic compounds by providing a simple and straightforward method which does not necessitate costly purifications of the products formed thereby.

Other objects will be apparent from the description and claims which follow.

These and other objects are attained by means of this invention as described hereinafter and defined in the appended claims. In contrast to processes employed heretofore which employed free phenolic compounds for preparation of hydroxy aromatic carboxylic acids, this invention entails the manufacture of hydroxy aromatic mono- and dicarboxylic acids by treatment of an acyl ester of a phenolic compound. By means of this invention, the desired hydroxy aromatic carboxylic acids are prepared in excellent yield and without the concomitant formation of tarry by-products. Any of the hydroxy aromatic carboxylic acids which could be prepared by the Kolbe synthesis can be prepared by means of this invention while avoiding the disadvantages inherent in the Kolbe synthesis or its various modifications as practiced heretofore. The invention is of particular advantage in the preparation of hydroxy aromatic carboxylic acids which were difficult to prepare by methods involving highly alkaline conditions which adversely affected the reactants or product.

Thus, this invention is applicable for preparing any of the mono- or dicarboxylic phenolic compounds including those having a single phenyl nucleus as well as those having a fused ring system. The compounds prepared in accordance with this invention have one or more hydroxyl groups and one or more carboxyl groups joined directly to an aromatic nucleus which can be otherwise unsubstituted or substituted with alkyl, aralkyl, aryl or amino groups. Accordingly, the invention is applicable for preparing any of the compounds of the formula $$\begin{array}{c}(OH)_x\\ \phantom{X}\\ (COOH)_y\\ (OH)\\ \phantom{X}\\ (COOH)\\ Z\end{array}$$

in which represents an aromatic nucleus of one or more carbocyclic rings, Z represents hydrogen or an alkyl, aryl or amino group, and x and y are either 0 or 1.

The compounds which are carboxylated in accordance with this invention have the formula $$\begin{array}{c}O\\ \parallel\\ (O-C-R)_x\\ \phantom{X}\\ Z\\ O\\ \parallel\\ (O-C-R)_y\end{array}$$

wherein the group $$(O-\overset{O}{\underset{\parallel}{C}}-R)$$

represents an acyl group, with R preferably being an alkyl group of 1–4 carbon atoms. The group

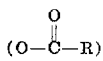

can be any hydrolyzable acyl group, however, since the nature of the acyl group does not affect the course of the reaction. The remaining symbols are as was indicated hereinabove.

Thus the compounds which are converted to hydroxy aromatic carboxylic acids in accordance with the invention include the phenyl acylates of the formula

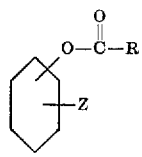

such as the acetates, propionates and butyrates of phenol; o-, m- or p-cresol; m-aminophenol; and similar esters of monocyclic phenols; phenyl diacylates of the formula

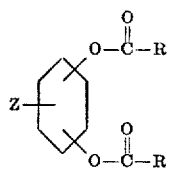

such as hydroquinone diacetate, toluhydroquinone diacetate, hydroquinone dibutyrate, toluhydroquinone dibutyrate, and similar acyl esters of these and similar dihydroxy benzenes; partial esters of the formula

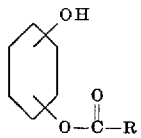

such as hydroquinone monoacetate, hydroquinone monopropionate, hydroquinone monobutyrate toluhydroquinone monoacetate and the like; as well as acyl esters of polycyclic phenols such as β-naphthol or substituted naphthols or the like. Esters of polyhydroxy compounds such as trihydroxy benzene can also be carboxylated in accordance with the invention.

As is apparent, the compounds carboxylated by means of the invention have two salient characteristics, namely, the presence of an aromatic nucleus and at least one hydrolyzable acyl group joined to the aromatic nucleus. Any of such compounds are suitable for use in practicing the invention whereby at least one carboxyl group is introduced on the aromatic nucleus.

In the process of the invention, the aromatic acylate is carboxylated by reacting it with carbon dioxide in the presence of at least a catalytic amount of potassium carbonate at an elevated temperature. The resulting product is then hydrolyzed to convert the acyl groups to hydroxyl groups whereby the desired hydroxy aromatic carboxylic acid is obtained. In contrast to processes using free phenolic compounds or those using highly alkaline conditions, the present invention gives carboxylated material in high yield and without the formation of objectionable amounts of tarry materials.

The process of this invention, wherein acyl esters of phenolic compounds are carboxylated, also has the distinct advantages that the reaction can be effected at temperatures as low as about 100° C., and at pressures from atmospheric pressure up to pressures of about 1000 p. s. i. or higher, that anhydrous conditions need not be maintained for excellent results, that the potassium carbonate can be used only in catalytic amounts or much larger amounts, and that the required carbon dioxide can be furnished by the introduction of carbon dioxide gas into the reaction system or can be formed in situ from the carbonate without the addition of free carbon dioxide. Furthermore, the carboxylation can be carried out in solvent medium, or it can be effected without the use of a solvent when carbon dioxide is introduced into the reaction system.

It is usually desirable to effect the reaction in the presence of at least one mole of carbonate or more for each mole of acyl ester being carboxylated, but only a minor amount of such carbonate needs to be potassium carbonate. Thus, although such materials as sodium carbonate are ineffective when employed in the absence of potassium carbonate, they can form the major portion of the carbonate present if desired. This is clearly illustrated in Table 1 in connection with the carboxylation of phenyl acetate.

TABLE 1

| Reactants (Moles) | | | Operating Conditions | | | Percent Phenyl Acetate, Carboxylated |
|---|---|---|---|---|---|---|
| Phenyl Acetate | $K_2CO_3$ | $Na_2CO_3$ | Temp., °C. | Time (Hrs.) | $CO_2$ Press (lbs.) | |
| 1.0 | 0.0 | 2.0 | 140 | 16 | 1,100–1,000 | 2.2 |
| 1.0 | 0.01 | 1.99 | 140 | 16 | 1,100–1,000 | 25.3 |
| 1.0 | 0.1 | 1.9 | 140 | 16 | 1,100–1,000 | 47.1 |
| 1.0 | 2.0 | 0.0 | 140 | 16 | 1,100–1,000 | 81.7 |
| 0.75 | 0.25 | 1.25 | 120 | 16 | 1,290–1,140 | 75.8 |
| 0.75 | 1.5 | 0.0 | 120 | 16 | 1,290–1,140 | 86.6 |

In carrying out the process of the invention, substantially anhydrous reactants are preferably employed for optimum yield of carboxylated product, although the presence of minor amounts of moisture in the carbonate can be tolerated in many cases. The effect of increasing moisture content on the degree of carboxylation is illustrated by the data set out in Table 2 in connection with the carboxylation of phenyl acetate.

TABLE 2

| Percent Moisture in $K_2CO_3$ | Total Percent of Phenyl Acetate Carboxylated |
|---|---|
| 16.5 | 8.8 |
| 4.6 | 52.6 |
| 0.0 | 86.6 |

The reaction embodying the invention is readily carried out in an autoclave. By use of water-soluble carbonates, any unreacted carbonate can be removed from the reaction mixture by the hydrolysis medium. Although no reaction vehicle is necessary, a solvent can be employed with good results.

The reaction can be effected in any of the well known nonpolar solvents which contain no hydroxy group or other group capable of reacting with the metallic ion which is present in the reaction mixture. Thus the hydrocarbon solvents such as benzene, toluene, xylene, hexane, petroleum ethers, and similar well known nonpolar solvents can be employed with equally good results. The amount of solvent can be varied as desired in accordance with the usual chemical practice and amounts of solvent equal to about twice the weight of the reactants have been found to be quite satisfactory although larger or smaller amounts can be used as desired. The reaction is ordinarily effected at a temperature in excess of 100° C. and usually in the range of 130 to 170° C., although the reaction temperature can be varied depending upon the particular reactants which are employed. In the case of the carboxylation of hydroquinone diacetate a reaction temperature of the order of 140–150° C. has been found to give optimum results.

The reaction time will, of course, depend upon the reaction conditions employed and will vary within rather wide limits; as, for example, from about 2 to about 24 hours. Following the reaction, the reaction mixture is cooled down and the reaction product can be washed out of the reaction vessel with hot water. In the preferred method, the reaction mixture is then hydrolyzed according to usual hydrolysis practices with water alone or by adding aqueous acid, such as dilute hydrochloric acid, or alkali, such as sodium hydroxide, to the reaction mixture whereby the free hydroxy aromatic carboxylic acid is obtained and any unreacted ester is hydrolyzed and can be recovered. Following hydrolysis, the solvent employed as a reaction vehicle can be removed by distillation and the hydrolyzed mixture is neutralized and filtered. Any unreacted phenolic material can be extracted out as, for example, by the use of diethyl ether or by a similar solvent partition method and the product recovered from the aqueous medium. The recovery of the product will, of course, depend upon the nature of the product and in some cases it can be precipitated out by adjusting the pH or by cooling the solution, and in other cases it can be extracted out by means of a suitable solvent. Thus, for example, gentisic acid is readily soluble in diisopropyl ether and the solubility characteristics of the other hydroxy aromatic carboxylic acids are well known to those skilled in the art.

The invention can be illustrated by the preparation of gentisic acid and 2,5-dihydroxy terephthalic acid from hydroquinone diacetate although the invention is not limited to the carboxylation of esters of hydroquinone. Other phenolic esters react in similar fashion and are within the scope of this invention as is apparent from the well known application of the Kolbe synthesis. In general it can be said that the process embodying this invention is applicable to the esters of any of the phenolic compounds which can undergo the Kolbe synthesis. In the preparation of gentisic acid and 2,5-dihydroxy terephthalic acid, hydroquinone diacetate, anhydrous potassium carbonate, and benzene are charged to a stainless steel autoclave and heated at 140–150° C. with agitation under carbon dioxide pressure for 12 to 22 hours. The autoclave is then cooled to 30–40° C. and the reaction mixture is washed out with hot water. The mixture is then acidified with hydrochloric acid and the solvent is distilled out. Any unreacted hydroquinone diacetate is hydrolyzed to the free hydroquinone. Thereafter, the aqueous slurry is neutralized to a pH of about 7 with sodium bicarbonate and filtered to remove traces of insoluble material. The filtrate is extracted with diethyl ether to remove any hydroquinone present and the aqueous layer from the extraction is acidified with hydrochloric acid and filtered to recover the 2,5-dihydroxy terephthalic acid. The aqueous filtrate from this step is then extracted with diisopropyl ether to remove the gentisic acid. If desired, unreacted hydroquinone diacetate can be recovered from the reaction mixture and recycled in subsequent cycles since the process can be effected either batchwise or by a continuous or cyclic process.

In the process embodying the invention, other phenolic esters such as the ester of 5-amino-1-naphthoic acid or the ester of 2-hydroxy diphenyleneoxide or other phenol compounds as described herein are carboxylated in similar fashion. The reaction temperature can be anywhere from about 20° C. to about 210° C. although it is preferably from about 90–100° C. to about 200° C.

The following detailed examples are included to illustrate a preferred mode of practicing the invention and are not intended to limit the scope of the invention.

*Example 1*

Into a stainless steel autoclave were charged 77.5 g. (0.4 mole) of hydroquinone diacetate, 110.5 g. (0.8 mole) of anhydrous potassium carbonate and 350 ml. of benzene. This mixture was then stirred for 12 hours at 140° C. under 700 to 730 pounds per square inch carbon dioxide pressure. The autoclave was then cooled, washed out with hot water, the reaction mass acidified with hydrochloric acid and the benzene distilled off. Thereafter, the reaction mixture was neutralized with sodium bicarbonate, filtered and extracted with ether. The insoluble residue amounted to 0.5 g. and the hydroquinone recovered from the ether extract amounted to 8.5 g. or 19.3% of that charged as the diacetate. The ether-extracted aqueous layer was then acidified with hydrochloric acid and filtered to recover the 2,5-dihydroxy terephthalic acid formed in the reaction. The filtrate was extracted with diisopropyl ether to recover the gentisic acid which had been formed. Of the hydroquinone diacetate charged to the reaction, 5.6% was converted to 2,5-dihydroxy terephthalic acid and 74.3% was converted to crude gentisic acid having a melting point of 194–198° C. (corrected).

*Example 2*

Hydroquinone diacetate was carboxylated as in the preceding example with the exception that a reaction pressure of 450–470 pounds of carbon dioxide was used. The reaction product contained 12.5% unreacted hydroquinone diacetate and 8.2% of the diacetate was converted to 2,5-dihydroxy terephthalic acid and 78.4% to crude gentisic acid having a melting point of 193.5 to 197.5° C.

*Example 3*

A batch of hydroquinone diacetate was processed as described in Example 1 except that the batch was autoclaved for 22 hours. In the reaction product, only a trace of unreacted hydroquinone diacetate remained and 34.0% of the diacetate had been converted to 2,5-dihydroxy terephthalic acid and 67.6% had been converted to crude gentisic acid having a melting point of 193–197° C.

*Example 4*

A mixture of 97 g. of hydroquinone diacetate, 138 g. of anhydrous potassium carbonate, 5 g. of ferrous sulfide, and 300 ml. of benzene was autoclaved at 150° C. for 12 hours under 420–800 pounds carbon dioxide pressure. The reaction mixture thus obtained contained 29.0% of unreacted hydroquinone diacetate, and 22% of the diacetate had been converted to 2,5-dihydroxy terephthalic acid and 42% had been converted to crude gentisic acid. The ferrous sulfide was employed in this reaction in an attempt to catalyze the production of carboxylated product since it has been used in the classical Kolbe synthesis. In this case, however, it is apparent that the reaction embodying this invention does not depend upon the use of such a catalyst. In practicing the invention, the metal carbonate should be anhydrous in order to give optimum results.

*Example 5*

A batch consisting of 77.5 g. of hydroquinone diacetate, 110.5 g. of anhydrous potassium carbonate and 350 ml. of benzene was autoclaved for 16 hours at 140° C. under a carbon dioxide pressure of 670–700 pounds.

In this run, a more efficient agitator was used and the formation of gentisic acid was thereby increased. Of the hydroquinone in the hydroquinone diacetate which was charged to the reaction, 24.1% remained unreacted and 73.1% was converted to gentisic acid. There was no formation of 2,5-dihydroxy terephthalic acid under these reaction conditions.

Example 6

As has been indicated, it is not necessary to introduce carbon dioxide into the reaction system in order to effect carboxylation in accordance with this invention. The exact mechanism by which the reaction proceeds is not clear at this time, although it would seem that the carbonate furnishes carbon dioxide for the reaction. Consequently, when the carboxylation with carbon dioxide is referred to herein, it will be understood that such carbon dioxide can be furnished in situ by the carbonate or can be added to the system. Thus, for example, an autoclave was charged with 414 g. of anhydrous potassium carbonate, 102 g. of phenyl acetate and 100 ml. of benzene. The mixture was stirred for 12 hours at 155–164° C. Although no carbon dioxide was introduced into the autoclave, a maximum pressure of 255 p. s. i. developed during the reaction. Of the phenyl acetate charged to the autoclave, 28.4% was converted to salicylic acid, 21.6% to p-hydroxy benzoic acid and 3.4% to 4-hydroxy isophthalic acid.

Example 7

The acetate esters are usually used for convenience and economy but the nature of the acyl group or groups is not a critical factor, and any hydrolyzable acyl ester gives equally satisfactory results. Thus, 125 g. of hydroquinone dibutyrate were stirred in a stainless steel autoclave with 207 g. of anhydrous potassium carbonate for 16 hours at 100–108° C. under 1000–1120 p. s. i. carbon dioxide pressure. The conversion to gentisic acid on a crude basis was 80.8% and a substantially 100% yield was obtained. The gentisic acid thus formed was of excellent quality, and it was not necessary to subject it to extensive purification since the tar formation ordinarily present in carboxylation reactions is largely obviated in the process of this invention. In this example, no solvent medium was employed.

Example 8

When carbon dioxide is introduced into the reaction system, it can be added in gaseous form if desired. One of the most convenient methods, however, is to add a calculated amount of solid carbon dioxide to the autoclave along with the other reactants. A mixture of 97 g. of hydroquinone diacetate, 207 g. of anhydrous potassium carbonate and 400 g. of solid carbon dioxide was charged to a stainless steel autoclave, and reaction effected at 100° C. for 16 hours at a reaction pressure of 1250–1410 p. s. i. Of the hydroquinone diacetate charged, 83.0% was converted to gentisic acid and 6.1% to 2,5-dihydroxy terephthalic acid. In contrast to this, a mixture of 55 g. of unesterified hydroquinone, 207 g. of anhydrous potassium carbonate and 400 g. of solid carbon dioxide was autoclaved for 16 hours at 100° C. and a reaction pressure of 960–1140 p. s. i. Of the hydroquinone charged, 3.9% was converted to gentisic acid and 1.0% to 2,5-dihydroxy terephthalic acid.

Example 9

A charge of 81.5 g. of phenyl acetate, 166 g. of anhydrous potassium carbonate and 460 g. of solid carbon dioxide was stirred in a stainless steel autoclave for 16 hours at 100° C. and a reaction pressure of 960–1130 p. s. i. Of the phenyl acetate charged, 47.8% was converted to salicylic acid and 35.8% to p-hydroxy benzoic acid.

Example 10

The proportions of carboxylated products can be varied depending upon the reaction conditions employed, and the wide range of possible conditions which can be employed in accordance with the invention makes it possible to make the desired variation as shown in this and the following two examples. A mixture of 102 g. of phenyl acetate, 207 g. of anhydrous potassium carbonate, 150 ml. of benzene and 225 g. of solid carbon dioxide was stirred in a stainless steel autoclave for 18 hours at 120° C. with a reaction pressure of 560–610 p. s. i. Of the phenyl acetate charged, 60.6% was converted to salicylic acid and 5.7% to p-hydroxy benzoic acid.

Example 11

A mixture of 102 g. of phenyl acetate, 207 g. of anhydrous potassium carbonate, 95 ml. of benzene and 225 g. of solid carbon dioxide was autoclaved for 7 hours at a temperature of 160° C. and a pressure of 900–940 p. s. i. Of the phenyl acetate charged, 10.2% was converted to salicylic acid and 70.0% to 4-hydroxy isophthalic acid.

Example 12

A mixture of 81.5 g. of phenyl acetate, 166 g. of anhydrous potassium carbonate and 460 g. of solid carbon dioxide was autoclaved for 16 hours, at a temperature of 100° C. and a pressure of 960–1130 p. s. i. Of the phenyl acetate charged, 47.8% was converted to salicylic acid and 35.8% to p-hydroxy benzoic acid.

Example 13

The reaction can be effected at atmospheric pressure with less advantageous results. A mixture of 102 g. of phenyl acetate, 207 g. of anhydrous potassium carbonate and 150 ml. of xylene was stirred at reflux temperature (141–167° C.) for 2.35 hours. The reaction mixture became too thick to stir so the reaction was discontinued. The reaction mixture, after being worked up, showed a conversion of 15.9% to salicylic acid and 7.3% to p-hydroxy benzoic acid.

Example 14

A mixture of 102 g. of phenyl acetate, 34.5 g. of anhydrous potassium carbonate, 133 g. of anhydrous sodium carbonate and 400 g. of solid carbon dioxide was charged to an autoclave and reacted for 16 hours at 120° C. and a pressure of 1140–1290 p. s. i. Of the phenyl acetate, 41.7% was converted to salicylic acid, 10.2% to p-hydroxy benzoic aid and 23.9% to 4-hydroxy isophthalic acid.

Example 15

A mixture of 104 g. of monotertiarybutyl hydroquinone monoacetate and 207 g. of anhydrous potassium carbonate was stirred for 17 hours at 117–124° C. under 1010–1080 p. s. i. carbon dioxide pressure. After hydrolysis, it was found that 72.6% of the ester charged to the reaction was converted to a high melting carboxylation product and 19.7% to a low melting carboxylation product, which appear to be the isomers, 3-tertiarybutyl-2,5-dihydroxy benzoic acid and 4-tertiarybutyl-2,5-dihydroxy benzoic acid.

Example 16

A mixture of 125 g. of monotertiarybutyl hydroquinone diacetate and 207 g. of anhydrous potassium carbonate was stirred in a stainless steel autoclave for 16 hours at 115–122° C. under 1070–1080 p. s. i. carbon dioxide pressure. The resulting carboxylated product was a mixture of isomers as in the preceding example, and 46.6% of the ester had been converted to high melting isomer and 43.0% to low melting isomer.

Example 17

A charge of 112.5 g. of p-cresol acetate, 207 g. of anhydrous potassium carbonate, and 100 ml. of benzene was agitated for 11.5 hours in a stainless steel autoclave at a maximum temperature of 144° C. and 885–890 p. s. i. carbon dioxide pressure. Of the p-cresol acetate charged, 87.5% was converted to 2-hydroxy-5-methyl benzoic acid.

Example 18

A charge of 96.5 g. of m-aminophenol diacetate, 208 g. of anhydrous potassium carbonate and 100 ml. of benzene was stirred in a stainless steel autoclave for 8 hours at 117–122° C. under 960–1060 p. s. i. of carbon dioxide. On a crude basis, 96% of the m-aminophenol diacetate charged was carboxylated, the product including 2-acetamido-4-hydroxybenzoic acid.

Example 19

A charge of 116 g. of hydroquinone monomethyl ether acetate and 193 g. of anhydrous potassium carbonate was autoclaved for 16 hours at 115–120° C. under 980–1000 lbs. carbon dioxide pressure. Of the ester charged, 88.5% was converted to 2-hydroxy-5-methoxy benzoic acid.

Example 20

A charge of 108 g. of 1,4-naphthohydroquinone monomethyl ether acetate and 207 g. of anhydrous potassium carbonate was agitated for 16 hours in a stainless steel autoclave at 132–141° C. under a carbon dioxide pressure of 760–800 p. s. i. A 56.2% conversion to monocarboxylated derivative having a melting point of 198.5–200.5° C. was obtained.

Example 21

A charge of 104 g. of toluhydroquinone diacetate and 207 g. of anhydrous potassium carbonate was stirred in a stainless steel autoclave for 12 hours at 116–123° C. under a carbon dioxide pressure of 1270–1470 p. s. i. to give substantially complete conversion to crude carboxylation product.

Example 22

Esters of polyhydroxy aromatic compounds are also readily carboxylated in accordance with the invention to introduce one or more carboxylic groups on the nucleus. Thus, for example 126 g. (0.5 mole) of hydroxy hydroquinone triacetate and 138 g. of anhydrous potassium carbonate were stirred in a stainless steel autoclave for 16 hours at 102–127° C. under a carbon dioxide pressure of 980–1020 p. s. i. The reaction mixture was hydrolyzed by boiling in 2000 cc. of water, acidified with hydrochloric acid, and filtered at 20° C. By this procedure 72.8 g. of carboxylated derivatives of hydroxy hydroquinone were obtained.

Thus by means of this invention, the preparation of hydroxy aromatic carboxylic acids is greatly facilitated and the disadvantages inherent in the conventional carboxylation methods are largely overcome. The reaction conditions can be varied rather widely whereby the reaction can be controlled to give the desired carboxylation product. The use of acyl esters instead of free phenols largely obviates the formation of tarry by-products and the yield of carboxylated product is greatly increased. As is apparent from the examples, any of the materials having an aromatic nucleus with at least one acyl group joined thereto by esterification of a phenolic hydroxyl group can be successfully carboxylated in accordance with the invention. By hydrolysis, the phenolic hydroxyl group is readily regenerated. The presence of substituent groups on the aromatic nucleus such as alkyl, aryl, aralkyl, alkoxy, amino and hydroxyl groups does not adversely affect the course of the reaction, and all such nuclearly substituted esterified phenolics are within the scope of the invention.

The amount of potassium carbonate used in the reaction can be varied from catalytic amounts up to 2 or more molar proportions for each molar equivalent of ester being carboxylated. The reaction can be effected without the addition of carbon dioxide except that furnished in situ by the reactants. Usually a reaction pressure in excess of 200–300 p. s. i. is preferred, although in some cases the reaction can be run at atmospheric pressure with less advantageous results. When small amounts of potassium carbonate are employed, another carbonate such as sodium or lithium carbonate can be used in conjunction with the potassium carbonate.

Although the invention has been described in considerable detail with reference to certain preferred embodiments thereof, variations and modifications can be effected within the spirit and scope of the invention as described hereinabove and as defined in the appended claims.

I claim:

1. The method of nuclearly carboxylating a hydrolyzable acyl ester of a hydroxy aromatic compound having an aromatic nucleus containing 6–10 carbon atoms and having at least one hydroxyl group joined directly to said aromatic nucleus which comprises heating, under substantially anhydrous conditions, one molar proportion of said ester and at least about two molar proportions of alkali metal carbonate, including at least about 0.25 molar proportion of potassium carbonate, at a temperature of 90–210° C.

2. The method of nuclearly carboxylating a hydrolyzable acyl ester of a hydroxy aromatic compound having a monocyclic nucleus of the benzene series and having at least one hydroxyl group joined directly to said nucleus which comprises heating, under substantially anhydrous conditions, one molar proportion of said ester with at least about two molar proportions of alkali metal carbonate, including at least about 0.25 molar proportion of potassium carbonate, in an atmosphere of carbon dioxide at a temperature of 90–210° C., and hydrolizing the resulting reaction product to a nuclearly carboxylated derivative of said hydroxy aromatic compound.

3. The method which comprises heating, under substantially anhydrous conditions, one molar proportion of a hydrolyzable acyl ester of a hydroxy aromatic compound having the characteristic structure

wherein Z is a member of the group consisting of hydrogen, lower alkyl groups, phenyl group, amino group and lower alkoxy groups and

is an aromatic nucleus from the group consisting of a monocyclic nucleus of the benzene series and a dicyclic nucleus of the naphthalene series, said hydroxy aromatic compound having 1–3 nuclear hydroxyl groups, said ester being characterized by having from one to all of said nuclear hydroxyl groups esterified with a lower saturated alkanoic acid containing 2–5 carbon atoms, with at least about two molar proportions of alkali metal carbonate, including at least about 0.25 molar proportion of potassium carbonate, under an atmosphere of carbon dioxide at a temperature of 90–210° C., and thereafter hydrolyzing the resulting reaction product to a nuclearly carboxylated derivative of said hydroxy aromatic compound.

4. The method which comprises heating, under substantially anhydrous conditions, a lower saturated acyl ester of a nuclearly hydroxylated monocyclic compound of the benzene series containing 1–3 nuclear hydroxyl groups, from one to all of said hydroxyl groups being esterified with lower saturated alkanoic acid, and at least two molar proportions of alkali metal carbonate per molar proportion of said ester, including at least about 0.25 molar proportion of potassium carbonate, under carbon dioxide at 90–210° C., and thereafter hydrolyzing the resulting reaction product to nuclearly carboxylated derivative of said nuclearly hydroxylated monocyclic compound.

5. The method which comprises heating, under substantially anhydrous conditions, a lower saturated acyl ester of a nuclearly hydroxylated monocyclic compound of the benzene series containing 1–3 nuclear hydroxyl groups, from one to all of said hydroxyl groups being esterified with lower saturated alkanoic acid, and at least two molar proportions of alkali metal carbonate per molar proportion of said ester, including at least about 0.25 molar proportion of potassium carbonate, under at least 200 p. s. i. carbon dioxide pressure at 90–210° C., and thereafter hydrolyzing the resulting reaction product to nuclearly carboxylated derivative of said nuclearly hydroxylated monocyclic compound.

6. The method which comprises heating under substantially anhydrous conditions a lower saturated acyl ester of phenol with carbon dioxide and at least two molar proportions of alkali metal carbonate per molar proportion of said ester, said alkali metal carbonate including at least about 0.25 molar proportion of potassium carbonate, at a temperature of 90°–210° C. and a pressure of at least about 200 pounds per square inch, and hydrolyzing the resulting reaction product to a nuclearly carboxylated derivative of phenol.

7. The method which comprises heating under substantially anhydrous conditions a lower saturated acyl ester of hydroquinone with carbon dioxide and at least two molar proportions of alkali metal carbonate per molar proportion of said ester, said alkali metal carbonate including at least about 0.25 molar proportion of potassium carbonate, at a temperature of 90°–120° C. and a pressure of at least about 200 pounds per square inch, and hydrolyzing the resulting reaction product to a nuclearly carboxylated derivative of hydroquinone.

8. The method which comprises heating under substantially anhydrous conditions about one molar proportion of phenyl acetate with at least about two molar proportions of alkali metal carbonate including at least about 0.25 molar proportion of potassium carbonate at a temperature of 90–210° C. and under carbon dioxide pressure in excess of about 200 pounds per square inch, and hydrolyzing the resulting reaction product to a nuclearly carboxylated derivative.

9. The method which comprises heating under substantially anhydrous conditions about one molar proportion of acetyl ester of hydroquinone with at least about two molar proportions of alkali metal carbonate including at least about 0.25 molar proportion of potassium carbonate at a temperature of 90–210° C. and under carbon dioxide pressure in excess of about 200 pounds per square inch, and hydrolyzing the resulting reaction product to a nuclearly carboxylated derivative.

10. The method which comprises heating under substantially anhydrous conditions about one molar proportion of hydroquinone monoacetate with at least about two molar proportions of alkali metal carbonate including at least about 0.25 molar proportion of potassium carbonate at a temperature of 90–210° C. and under carbon dioxide pressure in excess of about 200 pounds per square inch, and hydrolyzing the resulting reaction product to a nuclearly carboxylated derivative.

11. The method which comprises heating under substantially anhydrous conditions about one molar proportion of hydroquinone diacetate with at least about two molar proportions of alkali metal carbonate including at least about 0.25 molar proportion of potassium carbonate at a temperature of 90–210° C. and under carbon dioxide pressure in excess of about 200 pounds per square inch, and hydrolyzing the resulting reaction product to a nuclearly carboxylated derivative.

12. The method which comprises heating under substantially anhydrous conditions about one molar proportion of an alkyl phenyl acetate with at least about two molar proportions of alkali metal carbonate including at least about 0.25 molar proportion of potassium carbonate at a temperature of 90–210° C. and under carbon dioxide pressure in excess of about 200 pounds per square inch, and hydrolyzing the resulting reaction product to a nuclearly carboxylated derivative.

13. The method which comprises heating under substantially anhydrous conditions about one molar proportion of an acetyl ester of a cresol with at least about two molar proportions of alkali metal carbonate including at least about 0.25 molar proportion of potassium carbonate at a temperature of 90–210° C. and under carbon dioxide pressure in excess of about 200 pounds per square inch, and hydrolyzing the resulting reaction product to a nuclearly carboxylated derivative.

14. The method which comprises heating under substantially anhydrous conditions about one molar proportion of an acetyl ester of an aminophenol with at least about two molar proportions of alkali metal carbonate including at least about 0.25 molar proportion of potassium carbonate at a temperature of 90–210° C. and under carbon dioxide pressure in excess of about 200 pounds per square inch, and hydrolyzing the resulting reaction product to a nuclearly carboxylated derivative.

References Cited in the file of this patent

UNITED STATES PATENTS

| 150,867 | Kolbe | May 12, 1874 |
|---|---|---|
| 2,547,241 | Zienty et al. | Apr. 3, 1951 |
| 2,703,812 | Bann et al. | Mar. 8, 1955 |

OTHER REFERENCES

Andrisano et al.: Chem. Abstracts 46 (1952) 3944c.

U. S. DEPARTMENT OF COMMERCE
PATENT OFFICE

CERTIFICATE OF CORRECTION

Patent No. 2,816,137            December 10, 1957

Milton L. Clemens, Jr.

It is hereby certified that error appears in the printed specification of the above numbered patent requiring correction and that the said Letters Patent should read as corrected below.

Column 1, line 51, for "a well as" read --as well as--; line 72, for "with is" read --which is--; column 8, line 49, for "benzoic aid" read --benzoic acid--; column 11, line 35, for "90°-120° C." read --90°-210° C.--.

Signed and sealed this 25th day of February 1958.

(SEAL)
Attest:
KARL H. AXLINE

Attesting Officer

ROBERT C. WATSON
Commissioner of Patents